June 30, 1931.  J. J. DANNER  1,811,918

CHRISTMAS TREE SUPPORT STAND

Filed Dec. 31, 1928

INVENTOR.
John J. Danner
BY
ATTORNEYS.

Patented June 30, 1931

1,811,918

UNITED STATES PATENT OFFICE

JOHN J. DANNER, OF ST. PAUL, MINNESOTA

CHRISTMAS TREE SUPPORT STAND

Application filed December 31, 1928. Serial No. 329,333.

The present invention relates to a Christmas tree support stand. When an evergreen tree is cut and mounted upon a support stand for use as a Christmas tree in a heated building, the sap soon dries out and the needles have a tendency to fall off. It has been found that if the butt of the tree is immersed in water that the tendency of the tree to dry out and shed its needles is greatly reduced.

Figure 1:
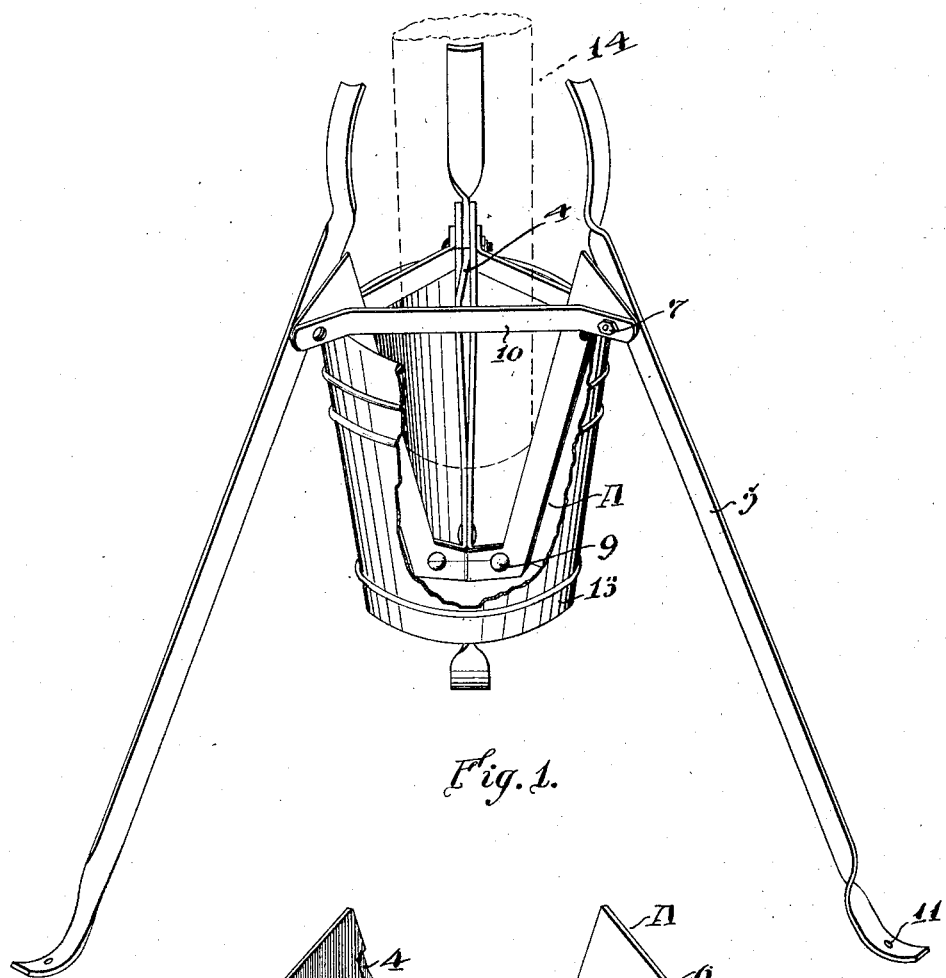

An object of the present invention is to make a Christmas tree stand having a water receptacle removably connected thereto. A structure embodying the invention is disclosed in the following description and the accompanying drawings wherein Figure 1 is a view in perspective of a structure embodying the invention. A portion of a water receptacle being broken away to show the construction of the supporting structure.

Figure 2:
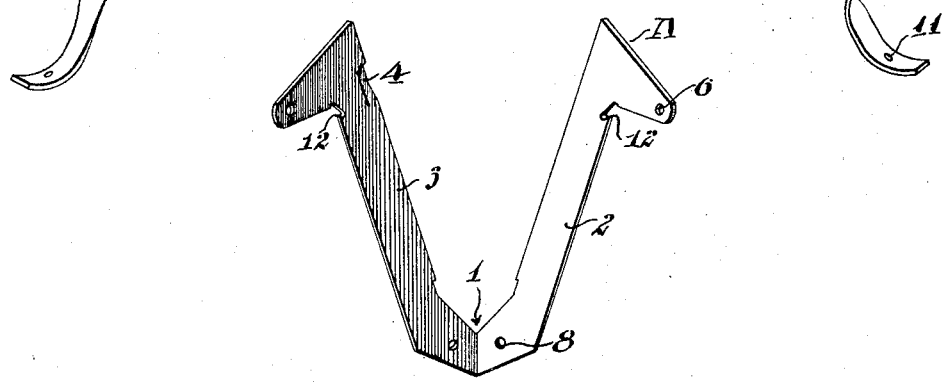

Figure 2 is a view also in perspectve of a portion of the device.

Referring to the drawings in detail, a triangular inner frame structure is composed of three sheet metal units A cut and bent to the shape shown in Figure 2, the two sides thereof being bent as upon the line 1 so that the planes of these two side portions 2 and 3 thereof are disposed at an angle of 120 degrees from each other. A stop lug 4 is formed on one leg of each of these members A to limit the pivotal movement of the supporting legs 5 mounted between the upper ends of the members A when assembled said lug being stamped up from the metal of the member A itself. The upper ends of the member A extend outwardly and being provided with openings 6 near the outer ends of these projections to receive a pivot bolt 7 for joining the structure and forming a pivotal support for the legs 5 of the device. Openings 8 in the lower ends of these members A are adapted to receive rivets 9 by means of which the inner structure is permanently united. Between the upper ends of each of the adjacent members A a supporting leg 5 is mounted, being pivotally supported upon the bolts 7. Bracing strips 10 are connected across each of the upper ends of the triangular frame work formed by the members A said strips being secured in position by means of the pivot bolts 7. The lower ends of the supporting legs are preferably twisted to lie at right angles to the main portion of the legs and are curved outwardly to prevent marring of the floor upon which the device rests. The curved lower portions of the support are provided with openings 11 through which nails or screws may be inserted to anchor the device firmly in position if desired. The upper ends of the supporting legs are twisted to lie at right angles from the main portion of the supporting legs and are curved inwardly as shown, to engage the trunk of the tree and prevent displacement thereof.

Beneath the outwardly projecting upper ends of the members A are notches 12 which receive the inturned upper edge of a container 13.

The upper edge of the container is preferably circular and slightly smaller than a circle determined by the outer edges of the notches 12 so that when the container is pushed upwardly into position, the sloping outer edges of the members A will act as cams to slightly distort the upper rim of the container 13 so as to permit the upper edge to spring back into the notches 12 when the inturned upper edge is moved to register with said notches.

To remove the container, the cam may be manually moved outwardly to disengage it from any one of the notches. By tilting it about the other two notches, it may be moved laterally to disengage the rim from said other two notches.

In using the device the container 13 is preferably sprung into position with the upper edge engaged by the notches 12 and the trunk of a tree 14 indicated in dotted lines in Figure 1 is then inserted so that its butt rests upon the sloped inner edges of the members A. The supporting legs 5 are then moved about the pivot bolts 7 so that the upper ends of said legs are in engagement with the trunk of the tree 14. The weight of the tree upon the legs tends to spread the lower ends of the legs further apart and in consequence the upper ends of the legs are forced inward to firmly grip the tree to prevent any displacement thereof. The container 13 may then be filled with water so as to cover the butt of the tree.

In taking the tree down from the stand, it is preferable first to remove the container in the manner previously described and by pivotally moving the lower end of any of the legs inward the tree is freed from the grip of the upper ends of the supporting legs and may then be lifted out of the device.

For shipping or storing the device, the legs may be pivotally moved about the bolts 7 to bring the legs into position along the sides of the container 13 to reduce the spread of the legs as much as possible.

I claim:

1. A tree support stand comprising a central triangular framework having a plurality of notches near the upper end thereof, a container adapted to fit over the lower end of said framework and having a portion thereof adapted to enter said notches to support said container and a plurality of supporting legs pivotally connected to said framework to pivot in converging planes whose axis of convergence is vertically above said container. The upper ends of said legs being positioned to supportingly engage the trunk of a tree supported in said framework.

2. A tree support stand comprising a triangular central framework having a notch in each apex thereof, a container having a portion thereof positioned to enter said notches to support said container the lower end of said triangular framework being positioned within said container when said container is mounted thereon, a supporting leg pivotally mounted in each apex of the triangular framework and pivoted to move in a vertical plane toward the center of the triangle defined by said framework, the lower ends of said legs extending beneath the framework and the container supported thereon and the upper ends of said legs being shaped to supportingly engage a tree trunk having the butt thereof resting upon and supported by said triangular framework.

3. A tree support stand comprising a central framework having notches in the outer edges thereof, said outer edges sloping inwardly toward the bottom of said framework below said notches, a container having a portion thereof shaped to enter said notches and having the upper opening thereof of slightly smaller diameter than that of a circle defined by any three of said notches, a plurality of supporting legs connected to said framework to pivot in vertical converging planes, the lower ends of said legs extending below the framework and the container supported thereby and the upper ends of said legs being formed to supportingly engage a tree trunk resting upon said inner framework.

4. A tree support stand comprising a central framework, a container adapted to receive the lower portion of said framework therein and having notched engagement with an outer edge of said framework to be removably supported thereon and a plurality of supporting legs pivotally connected to said framework to pivot in converging planes whose axis of convergence is vertically above said container when mounted on said frame.

In testimony whereof I affix my signature.

JOHN J. DANNER.